United States Patent [19]

Kumbasar

[11] Patent Number: 4,897,813

[45] Date of Patent: Jan. 30, 1990

[54] PARTIALLY PROGRAMMABLE READ-ONLY MEMORY SYSTEM

[75] Inventor: Cevat Kumbasar, Irvine, Calif.

[73] Assignee: Unisys Corporation, Blue Bell, Pa.

[21] Appl. No.: 157,775

[22] Filed: Feb. 19, 1988

[51] Int. Cl.[4] .................................. G11C 15/00
[52] U.S. Cl. ............................. 365/49; 365/189.02; 365/94; 364/900
[58] Field of Search .............. 365/49, 94, 189.02; 364/200 MS File, 900 MS File

[56] References Cited

U.S. PATENT DOCUMENTS

| | | | |
|---|---|---|---|
| 3,701,984 | 10/1972 | Burns | 365/49 |
| 3,911,406 | 10/1975 | McLaughlin et al. | 364/200 |
| 4,141,068 | 2/1979 | Mager et al. | 364/200 |
| 4,332,010 | 5/1982 | Messina et al. | 364/200 |
| 4,404,653 | 9/1983 | Ruhman et al. | 365/49 |
| 4,542,453 | 9/1985 | Patrick et al. | 364/200 |
| 4,610,000 | 9/1986 | Lee | 365/104 X |
| 4,612,612 | 9/1986 | Woffinder et al. | 364/200 |
| 4,654,847 | 3/1987 | Dutton | 371/10 |

FOREIGN PATENT DOCUMENTS 0175603  3/1986  European Pat. Off. .............. 365/49

*Primary Examiner*—Stuart N. Hecker
*Assistant Examiner*—Andrew L. Sniezek
*Attorney, Agent, or Firm*—Alfred W. Kozak; Nathan Cass; Robert S. Bramson

[57] ABSTRACT

A non-reprogrammable ROM holding microinstruction words cooperates with a Content Addressable Memory made of a TAG Memory and Data Memory. Portions of the locations in the TAG Memory have the same address as certain locations in the ROM so that when these selected addresses occur, a multiplexer will select the updated data from the Data Memory rather that from the ROM. The entire system is placed on one chip and provides great spatial surface savings over that which would be required if only a Static RAM were used for a control storage unit to hold the microinstruction words.

8 Claims, 6 Drawing Sheets

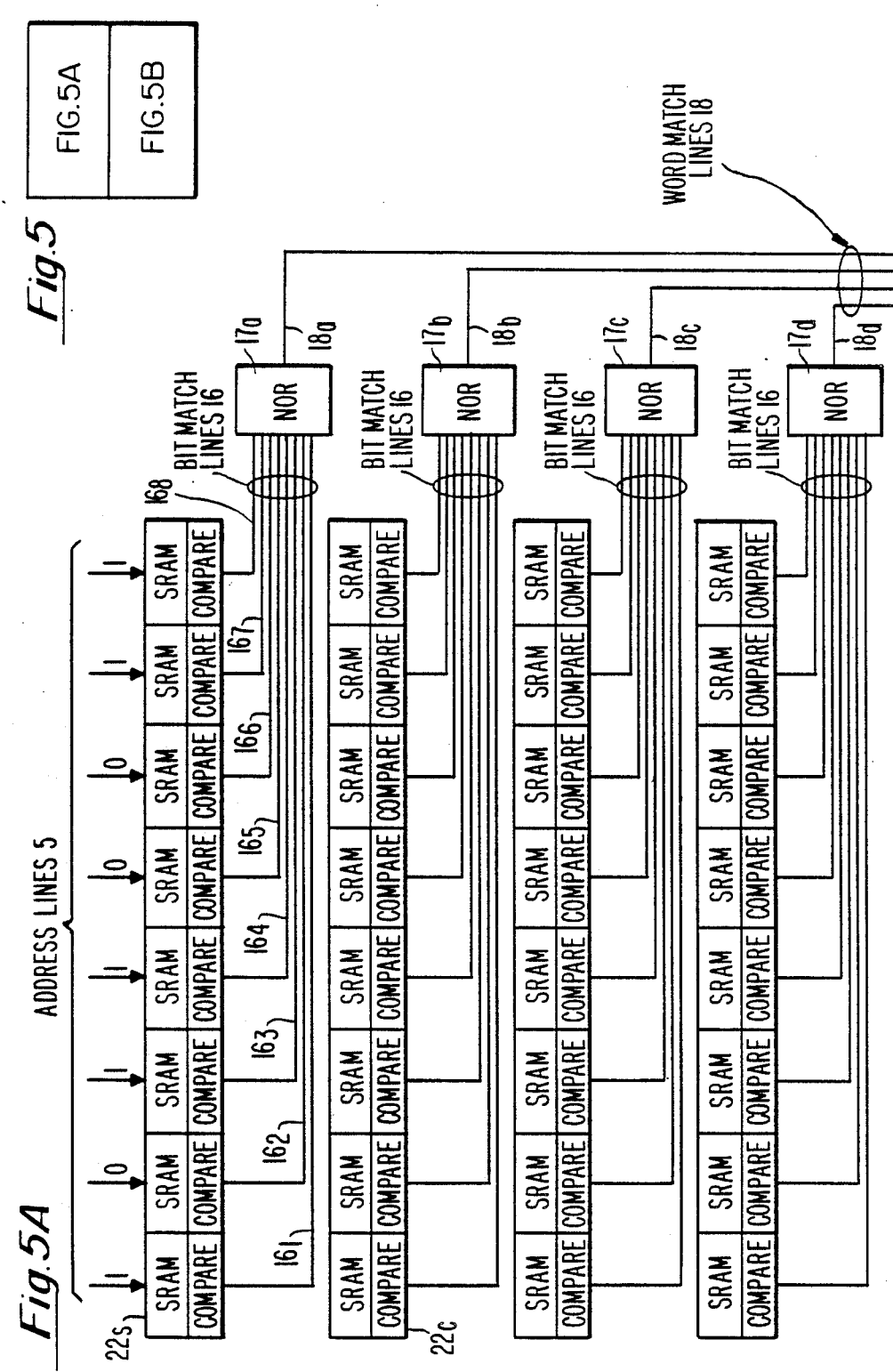

4,897,813

PARTIALLY PROGRAMMABLE READ-ONLY MEMORY SYSTEM

FIELD OF THE INVENTION

This disclosure relates to improved and more efficient means of storing microinstructions in read only memories (ROM), including the capability or reprogramming parts of the ROM.

BACKGROUND OF THE INVENTION

In the implementation of computer circuitry, a standard method for storing microinstructions is having them reside in a read only memory (ROM). The advantage of this is that the small area of space taken by the ROM chip is most desirable but it involves the disadvantage that this ROM memory is not reprogrammable.

Another useful technique that has been used to store microinstructions is the use of a Static RAM, however, this type of memory consumes five to six times more spatial area on the printed circuit board, but it does have the advantage of permitting reprogrammability. Additionally, most Static RAM's have not been built on integrated circuit chips while, on the other hand, the ROM memory units have been manufactured on integrated chips and provide a ready availability of memory for placement on a printed circuit board.

Thus, while a computer mainframe will often require a considerable amount of control store memory circuits, these have generally been implemented as "off-chip" arrangements rather than on integrated circuit chips for ready applicability to a printed circuit board. However, many of the new computer systems dictate that there be used "on-chip" control stores, but at the same time there is no desire to give up the capability to reprogram the control store and to add new instructions, in future, to the control store. Additionally, it is desired to run microdiagnostic codes in a maintenance mode.

Generally in these cases, it is highly unlikely that the complete series of microcodes in the memory (ROM) would have to be updated, but, however, it is quite possible that several locations, or a particular given location of microcodes in the control store would be possible candidates for future updates and changes.

The resolution of this type of situation has led to the design of an architecture as described in this disclosure which provides an improvement in the design and manufacture of control stores using read only memories for holding microinstructions. This is done by using a ROM control store which consumes a small amount of integrated circuit chip space and combining it with a content addressable memory structure (CAM) whereby a miniaturized or small version of a Static RAM can be combined with read only memory and used to supplant those locations in the read only memory (ROM) which it is desired to update or change, without any degradation in performance.

SUMMARY OF THE INVENTION

In order to provide a small-sized integrated circuit chip for storing microinstructions using a ROM-type basic structure, it is possible to enhance the non-programmability of the ROM structure by the addition of a parallel operating unit consisting of TAG addresses which can access data used to supplant certain locations in the original ROM microinstruction memory.

A microinstruction address line is applied to the control store consisting of a ROM memory unit while at the same time the address is provided to a TAG Memory into which there is placed specific addresses or address codes which will be used to alter the corresponding location in the ROM memory unit.

Thus, should a given address location in the ROM desired to be changed, this location is also placed in the TAG Memory and whenever this particular address location is addressed, the system will supplant the data in the original ROM memory with the appropriate updated data which has been sensed by the TAG Memory and whereby the TAG Memory will provide access to a "data memory" which provides the updated microinstruction word to supplant the original microinstructional word.

The TAG Memory consisting of addresses to be updated is connected to access an auxiliary data memory made of a miniaturized Static RAM, and the output of the Static RAM will provide an output of the updated microinstruction word data on an output line.

When the incoming address code matches a particular address in the TAG Memory, this is considered a "hit" and will cause a switching device or multiplexer to transmit the updated microinstruction word from the data Static RAM memory rather than from the ROM memory unit.

If the incoming address code is not to be found in the TAG Memory, then the ordinary situation will occur whereby the microinstruction word will be accessed from the ROM memory (no hit) and the output of the ROM memory will be passed on to the output to provide the original microinstruction word.

GENERAL OVERVIEW

Figure 1:
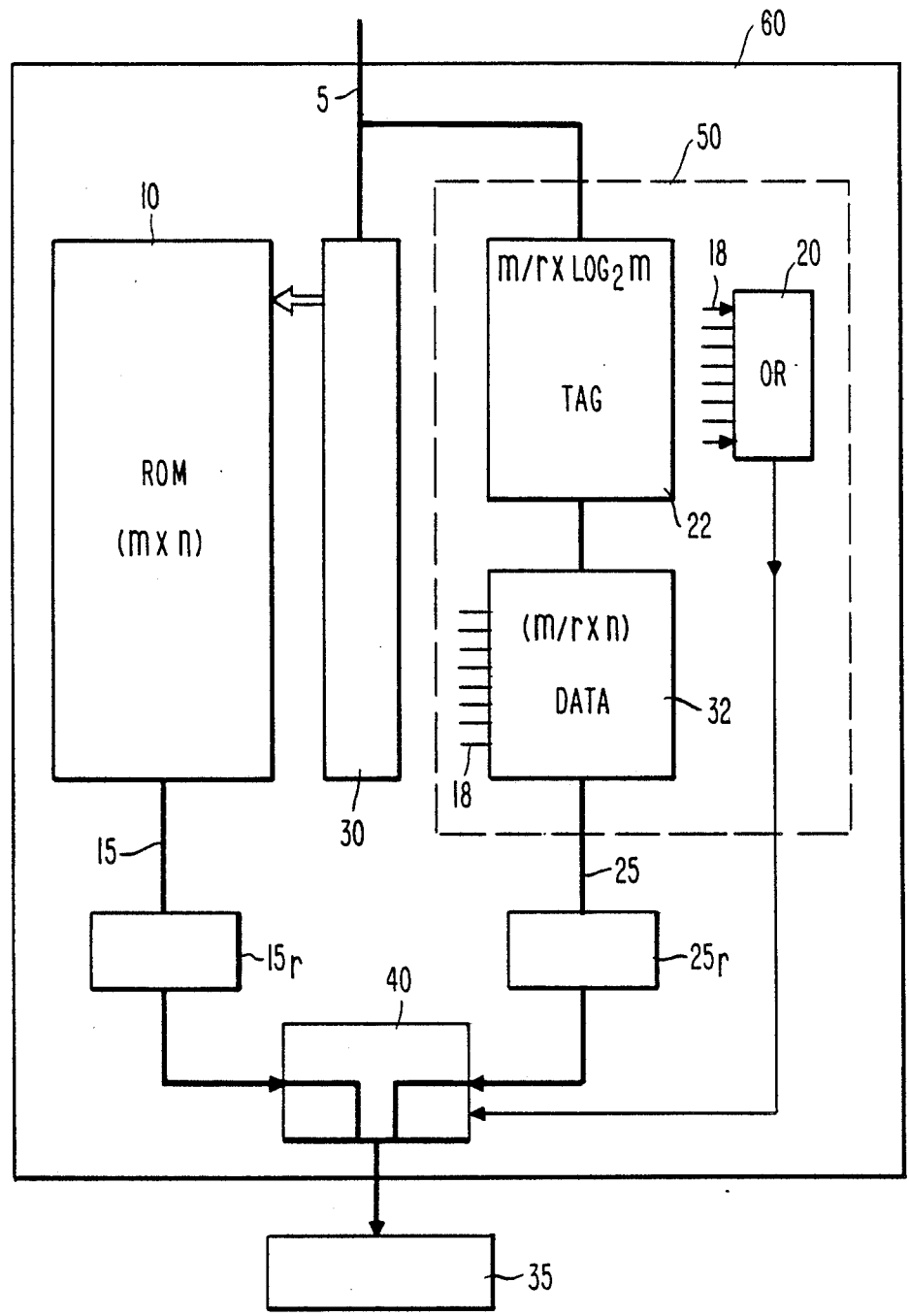
FIG. 1 is a block diagram of an integrated circuit chip having a Read Only Memory (ROM) control store for holding microinstruction words and additionally having another memory section designated Content Addressable Memory (CAM) unit.

Modern computer mainframes require a considerable amount of control store for microinstructions. Generally, due to the heavy quantity of memory required, these control stores have been implemented on an "off-chip" basis rather than being manufactured into an integrated circuit chip.

For example, one type of computer architecture has a distributed control store concept whereby control store memories are placed at different areas of the architecture. However, even in a case like this, the required storage may rise from 100,000 bits to 300,000 bits per chip.

Normally the preferred way was to use the memories known as Static RAM's which permitted future updates and reprogrammability. These however incurred an immense area penalty for those types of control stores which were placed on integrated circuit chips.

The commercial type of Static RAM's which are "off-chip" have a performance penalty and increase the die count on the IC package, plus consuming greater areas on the printed circuit boards.

Alternatively, "on-chip" ROM's consume much less area, but this incurs the disadvantage of being "non-reprogrammable".

Many commercial microprocessors utilize read only memories (ROM's) as the store for their microcode which microcode can easily be verified, relative to a mainframe, since their instruction set is small and not exceedingly complicated.

Often modern mainframe computer performance dictates that the control stores be placed "on-chip", but the designers reluctantly do not want to incur the penalty of giving up the capability to reprogram the control store.

A typical instruction set known as the "E-Mode" instruction set (used in Unisys mainframes) involves a moving and unfixed set of conditions which may change from time to time. There are always conditions which will never be able to be predicted during manufacture in the plant or factory, but wherein a user in the field will run into a problem or a desired instruction operation. Thus it is most desirable to be able to reprogram the control store, or even add more instructions in the field as an economic way of developing the proper performance.

Normally, it is highly unlikely that a field operator would have to update the complete microcode. However, any and all locations in the read only memory microcode are possible candidates for being updated. There may also be extensions to the existing microcode.

The herein described disclosure provides a suitable improvement by combining a read only memory (ROM) and a content addressable memory (CAM) structure having minimal surface area and also providing a "programmable function" for the control store.

The percentage of the updatable control store locations can be decided in advance based on field experience or field data.

Subsequently herein, there is given an example to emphasize the area advantages and performance advantage provided by this system. The configuration also takes advantage of the Static RAM s fast access time with respect to the access time required for a read only memory (ROM).

For example, a 4K×45 microinstruction control store (such as for the Data Memory 32) is addressed with 12 bits.

Also, the use of a 256×12 content addressable memory (CAM) structure will indicate that if the specific address resides in the TAG section (see FIG. 3), there is a coincidence or "hit" and the contents of the address are then used to access data from the data section of the content addressable memory.

A "hit-bit" is generated and can be used to control a switching device such as the multiplexer 40 of FIG. 1, and thus the right column of the content addressable memory is selected rather than any data which may have resided in the ROM 10.

If there is no hit, then the microinstruction word data from the ROM 10 is considered valid and the left-hand column (ROM branch 10) is selected in order to provide an output to register 35 of the microinstruction word.

The contents of the content addressable memory are loaded at initialization time. In this example it is assumed that 1/16th on the locations in the ROM 10 are to be made programmable.

As the area of memory is proportional to the transistor count, the Table I below will show the possible savings:

TABLE I (1) USING ONLY A STATIC RAM FOR THE CONTROL STORE MODULE

| MODULE | PROVIDES | REQUIRED TRANSISTORS |
|---|---|---|
| 4K × 45 SRAM | 180,000 bits | 1,080,000 |

(2) CONTROL STORE USING ROM PLUS CAM (TAG MEMORY AND DATA MEMORY)

| | MODULE | PROVIDES | REQUIRED TRANSISTORS |
|---|---|---|---|
| (a) | 4K × 45 ROM | 180,000 bits | 180,000 |
| (b) | 256 × 12 TAG (SRAM) | 3000 bits | 30,000 |
| (c) | Data SRAM | 11,520 bits | 69,120 |
| | | Total | 280,000 (instead of 1,080,000) |

Thus there is approximately 75 percent savings in spatial occupation-area by combining a ROM 10 and a CAM 50 into a control store. Additionally, the performance, (timing) of the ROM 10 is not affected.

The basic feature involved here is not to keep track of the updated address location at all the locations, but rather at only some of the locations. Thereby one is enabled to get rid of considerable amounts of storage space requirements.

This described configuration only stores addresses of those locations which have been changed or updated, and it also checks if the address request is one which is directed to one of the updated addresses.

The delay time through the ROM 10 and through the CAM 50 should be balanced making the inside mechanism transparent to the user since ROMs are inherently slower than Static Random Access Memories (SRAM).

Thus referring to FIG. 1 as an example, if the ROM 10 is composed of 4K×45 bits (m×n) and if the TAG Memory 22 is made of 256×12 bits, while the SRAM or Data Memory data 32 is composed of 256×45 bits, and wherein both the ROM and the SRAM TAG unit are simultaneously addressed with a 12-bit address, then Table II indicates the needed "additional" transistors for enabling reprogrammability.

TABLE II

| | Percent Programmability | Additional Transistor Count Required |
|---|---|---|
| (a) | ¼ (25%) | 2 × ROM transistor count |
| (b) | ⅛ (12½%) | 1 × ROM transistor count |
| (c) | 1/16 (6¼%) | ½ × ROM transistor count |

In other words, the Group (a) situation requires the addition of two times the original number of transistors in the ROM 10.

Group (b) requires the added amount of transistors exactly equal to the number of transistors in ROM 10.

Group (c) requires the added amount of transistors equal to one-half the number of transistors in ROM 10.

DESCRIPTION OF PREFERRED EMBODIMENT

Referring to FIG. 1, there is seen an enhanced or partially reprogrammable control store unit 60 residing on a chip and having an input microinstruction address bus 5 and an output microinstruction register 35.

Within the enhanced control store unit 60, there is provided a ROM 10 and a content Addressable Memory (CAM) 50, each of which will simultaneously receive the same address data via the bus 5. The Content Addressable Memory (CAM) 50 has a TAG Memory 22 which will be organized to contain only those addresses (in ROM 10) which are desired to be changed or updated.

If the incoming address data on bus 5 is found to concurrently reside in the TAG Memory 22 (as will be discussed in connection with FIG. 3), this is called a "hit" and the address which was selected in the TAG Memory 22 is then conveyed to the Static data RAM (SRAM) 32 in order to access and retrieve the updated microinstruction word which is to be accessed and then conveyed on bus 25 into multiplexer 40 where it is placed in the register 35.

The multiplexer 40 is sensitive (via line $40_n$) to the fact that there was a "hit" and the multiplexer 40 will then pass through the updated microinstruction word from the SRAM 32.

As will be noted in FIG. 1, a OR gate 20 has match lines 18 connected to each individual word location of the TAG Memory 22. Thus, if there are 256 word locations in the TAG Memory 22, then 256 match lines will be conveyed to the NOR gate 20. Thus when an address is completely matched, this will constitute a "hit" and the NOR gate 20 will send an appropriate signal on line $40_n$ to the multiplexer 40 to signify a "hit".

Alternatively, if the incoming address on the address bus 5 is found within the ROM 10, but not in the TAG Memory 22, then the NOR gate 20 will activate the "no-hit" signal to the multiplexer 40, and then the appropriately addressed microinstruction word will then be retrieved from the ROM 10, conveyed on bus 15 to the multiplexer 40, which is placed in the "no-hit" situation, and the multiplexer 40 will then pass the microinstruction word from the ROM 10 over to the output register 35.

In FIG. 1 the added memory structure of the CAM 50 is made up of the TAG Memory 22 and the SRAM 32. These are configured on the estimate that probably only a small percentage of memory locations in the ROM 10 will necessitate updating or changes. For example, possibly one in eight (12½ percent) of the microinstruction words in the ROM 10 may be subject to change or updating. Thus these locations (12½ percent of programmed microinstruction words) can then be set up as addresses in the TAG Memory 22 so that they will be recognized when they occur on the incoming address bus 5. Then subsequently the SRAM memory 32 can be programmed with the newly updated microinstruction words for each of the address locations which were newly placed in the TAG Memory 22.

Figure 5B:
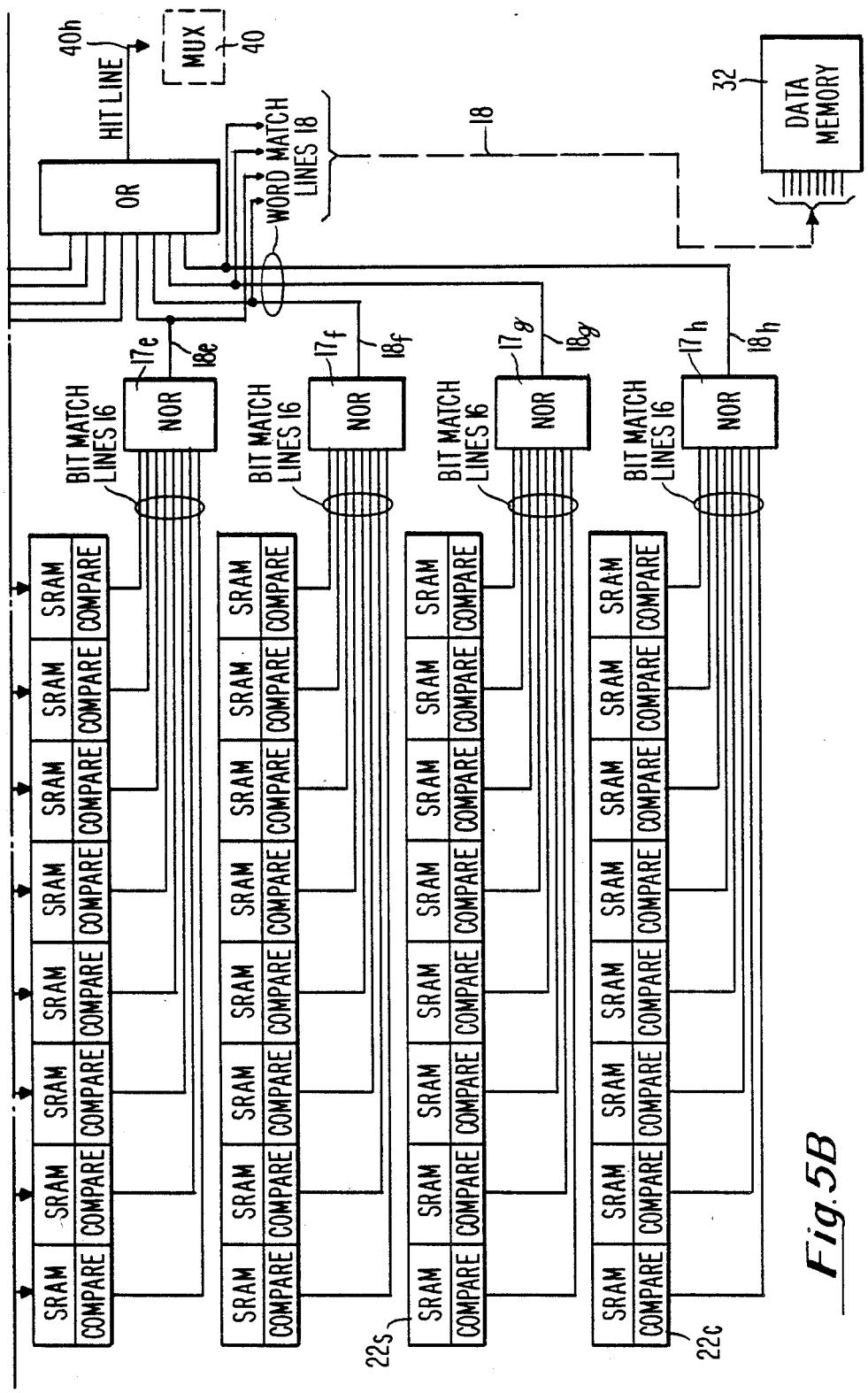
FIG. 5 (composed of FIGS. 5A and 5B) is a drawing showing in greater detail the TAG Memory of FIGS. 1, 2, and 3 whereby each cell of the TAG Memory has a Static RAM cell and comparator which provides a match line to the OR gate 20 which provides a word match output line to the multiplexer 40.

By using the SRAM structure (data memory 32), such as described hereinafter in connection with FIG. 5, for the TAG Memory 22 and for the data structure 32, the entire structure 50 (CAM) can be kept reasonably small in spatial area, and since the ROM 10 will only take a minimal amount of area, then the entire system structure can be placed on a chip 60 (occupying only 10 percent of the useful chip area), such as seen in FIG. 1.

Figure 2:
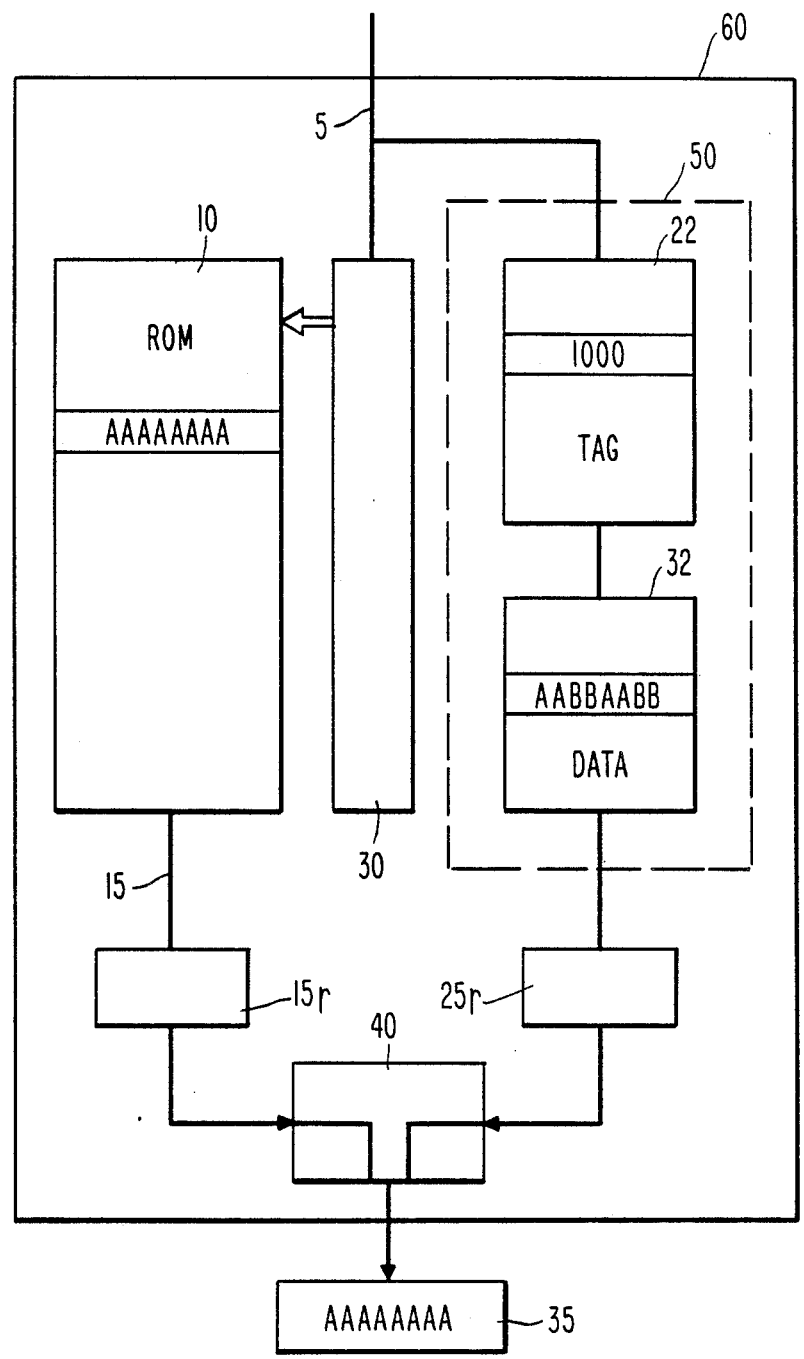
FIG. 2 is a drawing of the partially programmable chip indicating how a microinstruction address line is conveyed through an address decoder to the ROM and also conveyed to the content addressable memory unit.

Referring to FIG. 2, there is seen a structure similar to that of FIG. 1 except there is added an address decoder 30 which is normally used to access the microinstruction word locations in the ROM 10. As before, the TAG Memory section 22 and the Data Memory section 32 are both SRAM's. Also shown are registers $15_r$ and $25_r$ which can be used to hold the respective outputs of ROM 10 and Data Memory 32.

In the FIG. 2 situation, it may be assumed that an incoming address 1000 (HEX) is inserted and decoded in order to access a memory location having the microinstruction word "AAAAAAAA". In this case the TAG Memory 22 does not have any comparable address notation to signify that this particular location in ROM 10 should be changed or updated. Thus the NOR gate 20 (FIG. 1) will signal the "no-hit" situation on line $40_n$ to the multiplexer 40. Thus the microinstruction word "AAAAAAAA" will be conveyed on bus 15 into multiplexer 40 and thence out into the output register 35 where the output microinstruction word "AAAAAAAA" will then reside.

Figure 3:
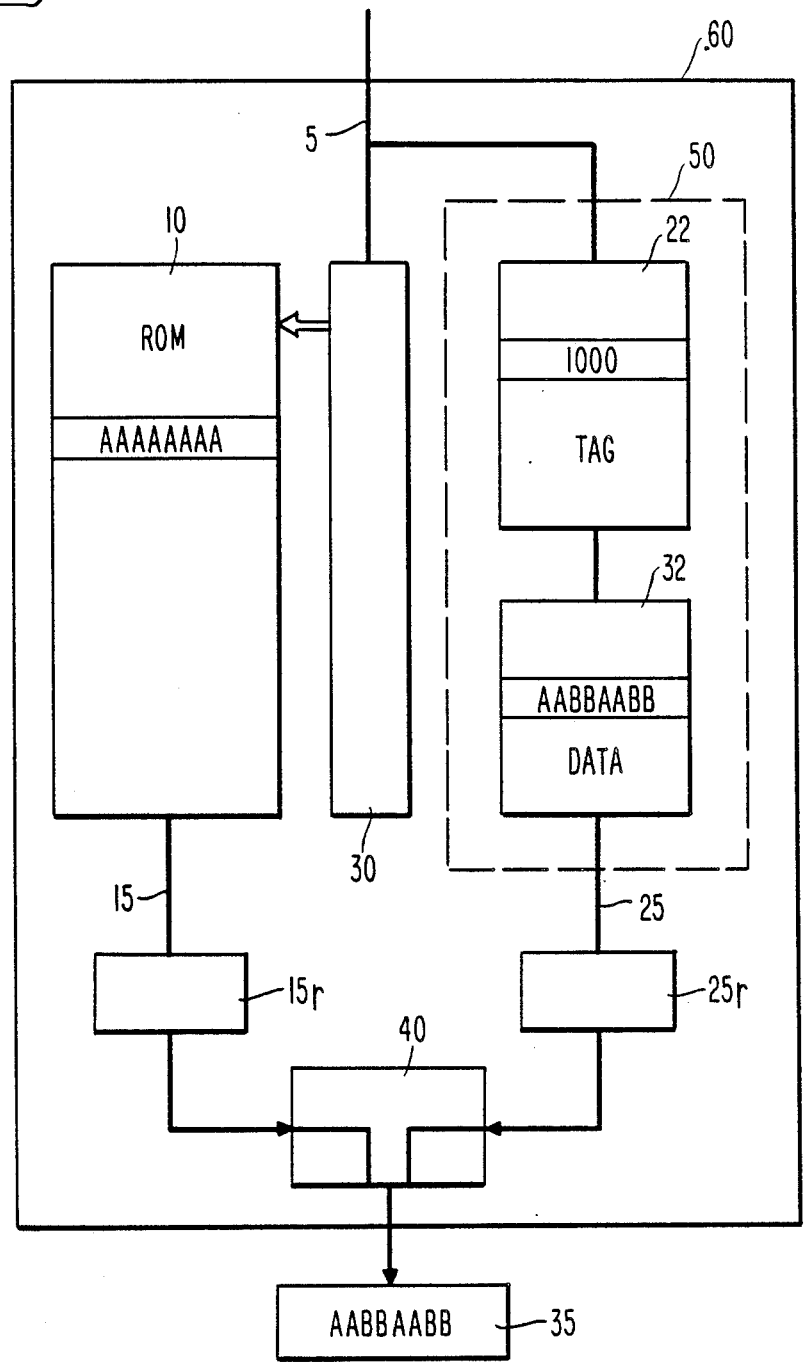
FIG. 3 is a drawing indicating how the CAM has a TAG portion which can be used to address a Static RAM in order to provide updated microinstruction words.

Now referring to FIG. 3, the situation occurs where it is desired to update or change the microinstruction word in the ROM 10 which is seen as "AAAAAAAA". The newly updated microinstruction word (desired to replace the word in ROM) is the microinstruction word "AABBAABB". This word is placed in the Data Memory 32 of FIG. 3. Now, when the microinstruction address bus 5 carries the address 1000 (HEX), this address will be recognized by the TAG Memory 22 which has been programmed (as is possible with a SRAM) to recognize the address of 1000. Additionally, the Data Memory 32 has, at its locational address 1000, been provided with the new microinstruction word "AABBAABB".

Thus, when the TAG Memory 22 recognizes the incoming address 1000, it will access the proper location in the Data Memory 32 and also the NOR gate 20 will signal the multiplexer 40 that a "hit" has occurred. Under these conditions, the microinstruction word "AABBAABB" will be conveyed from the Data Memory 32 onto bus 25 and into the multiplexer 40 which selects the word for conveyance into the output register 35 where there will occur the microinstruction word—AABBAABB—.

As illustrated in FIG. 5, the TAG Memory 22, which comprises a SRAM, is made up of individual cells to carry one bit of information for each bit of the incoming microinstruction address data. Thus in FIG. 5, if the TAG Memory 22 carries address words composed of 11 bits of data, then there will be 11 cells for each word line of the TAG Memory.

As seen in FIG. 5, each cell is composed of a SRAM portion and a comparator portion. The comparator portion of each cell provides an output match line 16 which feeds to the NOR gate 20. The NOR gate 20 will indicate the situation when each and every bit of the address data matches the address data in the TAG Memory so then the NOR gate 20 will provide an output word match line 18 to indicate the complete coincidence of bits. Thus, for example, if the entire address data fed to the TAG Memory, matches completely the address in the TAG Memory, then the word match line (bus 18) will address the data memory 32 in order to retrieve the updated microinstruction word for deposit into the output register 35 (via multiplexer 40 of FIG. 1)

while the hit line $40_n$ will provide a high (=1) logic signal to the multiplexer 40 to indicate the "hit" condition enabling the multiplexer 40 the deposit data (microinstruction word) from the data memory 32 into the register 35.

On the other hand, if there if a "mismatch" in any of the cells $22_s$, then the bus 18 (word match lines FIGS. 5A, 5B) will cause OR gate 20 to output a "low" (=0) output signal to signify the "no-hit" situation causing multiplexer 40 to deposit data (microinstruction word) from the ROM 10 into register 35.

As seen in FIG. 1, the ROM 10 is marked with the letters (m×n). The "m" signifies the number of rows of word locations in the ROM 10. The symbol "n" signifies the number of bits in each word. For example, the "m" could signify 2K rows which represents 2,048 rows. Likewise, the symbol "n" could represent the word length of 45 bits.

The symbol "r" is used to designate the percent or proportion of locations (in ROM 10) which it is desired to have the microinstruction words changed.

In FIG. 1, the TAG Memory 22 has the added designation formula "m/r×$\log_2 m$. This formula represents the capacity of the TAG Memory 22, that is to say the number of address bits which can be placed in the TAG Memory. The portion designated as "$\log_2 m$" is used to designate the width of each address word location in the TAG Memory 22.

For example, if the TAG Memory has a value of 2K (where 2K equals 2,048), then the $\log_2$ of "2K" will be equal to 11 bits which will determine the address word size of the TAG Memory 22.

Now assuming that "m" is equal to 256 which means there are 256 rows of words and each word is 11 bits in length (n equals 11), then the TAG Memory 22 would be made up of 2,816 bit-locations or cells. This involves 256 addresses of 11 bits each.

Now if the symbol "r" equals 12½ percent (meaning that reprogrammability is provided for one out of each eight ROM locations) and since there are 2K locations (2,048) in the ROM 10, then:

$$\frac{m}{4} = \frac{2K}{8} \times \log_2 2K \text{ gives}$$

256 × 11 = 2,816 bits for the TAG Memory 22

This provides 256 locations of 11 bits each for the TAG Memory 22.

In FIG. 1 and with reference to the "Data Memory 32", the capacity of Data Memory 32 is seen to be m/r×n; and where n equals 45 bits.

Here a 2K data memory size may be used, and $$\frac{m}{r} = \frac{2K}{8} = \begin{array}{l} 256 \text{ word locations of 45 bits} \\ \text{each for the Data Memory.} \end{array}$$

Thus 556 locations×45 bits gives a requirement for 11,520 bits capacity.

Now referring to FIG. 5, there is seen a detailed structure of the TAG Memory 22. A series of microinstruction address lines 5 are fed into a series of SRAM cells $22_s$. In this case, there is shown eight groups of SRAM's in which there exist eight SRAM cells in each group. Each one of these SRAM cells is connected to an individual microinstruction address line 5 shown connected to the top group of SRAM's.

Each SRAM cell $22_s$ also has a compare circuit $22_c$. Each one of the compare circuits has a bit match output line which is illustrated in the top group as output lines $16_1, 16_2, 16_3$—$16_8$. The combination set of bit lines $16_1$ through $16_8$ form the bit match lines bus 16 which is fed into NOR gate $17_a$.

Likewise for each of the other groups of SRAM's and compare circuits, there is a corresponding set of "bit match" lines 16 which feed to the NOR gates $17_b, 17_c, 17_d, 17_e, 17_f, 17_g,$ and $17_h$.

The outputs of each of the NOR gates $17_a$ through $17_h$ provide a series of output lines $18_a$ through $18_h$ to provide a set of "word match" lines designated as bus 18. This set of word match lines (bus 18) provides input to the OR gate 20 and also feeds the address data to the data memory 32.

The output of the OR gate 20 is the "hit" line output $40_n$ which is fed to the multiplexer 40 to determine whether or not a "hit" has occurred and thus to switch the multiplexer to provide the output to the register 35 from the Data Memory 32 when the hit has occurred.

To give a particular example, it may be seen that, in FIG. 5, a series of address bits are placed on the address lines 5 such as 1-0-1-1-0-0-1-1. Now, if this address matches the address of the top group of SRAM's, then the compare lines $16_1$–$16_8$ will all have an output of zero which is fed to the NOR gate $17_a$. The NOR gate $17_a$ will then put out a 1 (digital one) on its output line $18_a$ to indicate that an address match has occurred. All of the rest of the output lines $18_b$ through $18_h$ will provide a digital output of "zero" since there was no match. After these inputs are fed to the OR gate 20, the OR gate 20 will put out a digital "1" on the hit line $40_n$ in order to inform the multiplexer 40 that it should convey the information from the Data Memory 32 into the microinstruction word register 35. Thus, anytime that an incoming address on bus 5 matches a particular group of SRAM's $22_s$, then that particular group of SRAM's will initiate the hit line from OR gate 20 and also will send the address on line 18 over to the Data Memory 32 which will cause the retrieval of the appropriate data from the Data Memory 32 for conveyance to the microinstruction word register 35.

SIZE EFFICIENCY OF MEMORY STRUCTURES

If it is assured that the symbol K is equal to 1,024, it may be useful to observe a typical situation in order to better understand the efficiency and space-saving characteristics of the present configuration. If the ROM 10 is assumed to be the size of 2K rows×45 bits per word (m×n); And further assuming that the TAG Memory 22 has 256 word locations of addresses and each address is 11 bits in length;

And further assuming that the Data Memory 36 (SRAM) has 256 locations each of which is 45 bits in length Now assuming that one in each eight cf the ROM 10 memory locations will be desired for updating or future changes, thus r is equal to 8.

Thus since there are 2K (2,048) locations, then 12½ percent (or one in eight) of these locations would give us the figure of 256 locations which would be capable of being updated.

2,048 divided by 256 equals 8; thus r is equal to 8.

Now looking at the TAG Memory 22 and its partial formula $\log_2 m$, this will result in the figure of $\log_2$ times 2K which is equal to 11 since $2^{11}$ is equal to 2,048.

Thus it is seen that the number of bits required for each word in the TAG Memory 22 will be 11 bits. Now, making the standard assumption that one transistor constitutes one basic core cell which is the basic area unit to be designated on a chip; and further assuming that the basic unit for the Data Memory SRAM 32 will require an area equal to 6 (per FIG. 4) transistor cells for each single transistor cell in the ROM 10; and assuming that the TAG Memory, which requires a series of SRAM cells and compare circuitry, requires 9 (per FIG. 4) transistor cells for each single transistor cell in the ROM 10 and then assuming that the TAG Memory 22 will have 250 memory locations of 11 bits each, then by referring to the size formula shown in FIG. 1 for the TAG Memory 22 and for the Data Memory 32, the following occurs:

TAG Memory: Size equals $m/r \times \log m_2$

Data Memory 32: Size equals $m/r \times n$

In the case of the TAG Memory 22, this represents 256 (11×9) or a total of 25,344 added transistors necessary for the TAG Memory 22. This represents the part of the formula $r \times \log m_2$.

Now regarding the Data Memory 32 with the formula shown on FIG. 1 of the size being $m/r \times n$, and with r equal to 8 and m equal to 216 and n equal to 45, the additional transistors required will come to 256×45 which is equal to 11,520 additional transistors.

Thus the total of 25,344 transistors for the TAG Memory 22 and the additional transistors 11,520 for the Data Memory 32 come to a total of 36,864 transistors, which is the figure of the additional transistors required for the TAG Memory 22 and the Data Memory 32 (CAM 50). This represents the situation that 12½ percent (one in eight locations) of the ROM memory 10 is capable of being programmed through use of the combination TAG Memory and Data Memory represented by the CAM 50 of FIG. 1.

Since the ROM 10 represents one transistor per cell and since m×n (FIG. 1) is equal to 2K×45—this represents 92,160 cells in the ROM 10, of which 12½ percent can be reprogrammed through use of the TAG Memory 22 and the Data Memory 32.

Thus, with the addition of 36,864 additional cells (in the TAG and data memories), it is possible to provide an additional 12½ percent factor of reprogrammability.

AREA AND SPATIAL CHARACTERISTICS

Since the ROM 10 for this example is made up of 92,160 cells, and since the average chip cell is considered to be 30 square microns (FIG. 4), then multiplying 30 times 92,160 we get a figure of 2,764,800 square microns required for the ROM 10. By taking the square root of this figure, this provides a square area of 4 sides of which each side has a value of 1,662 microns. Since 1 mil is equal to 25.4 microns, then 1,662 microns is equal to 65.43 mils, which involves a square area of 65.43×65.43 mils.

Figure 4:
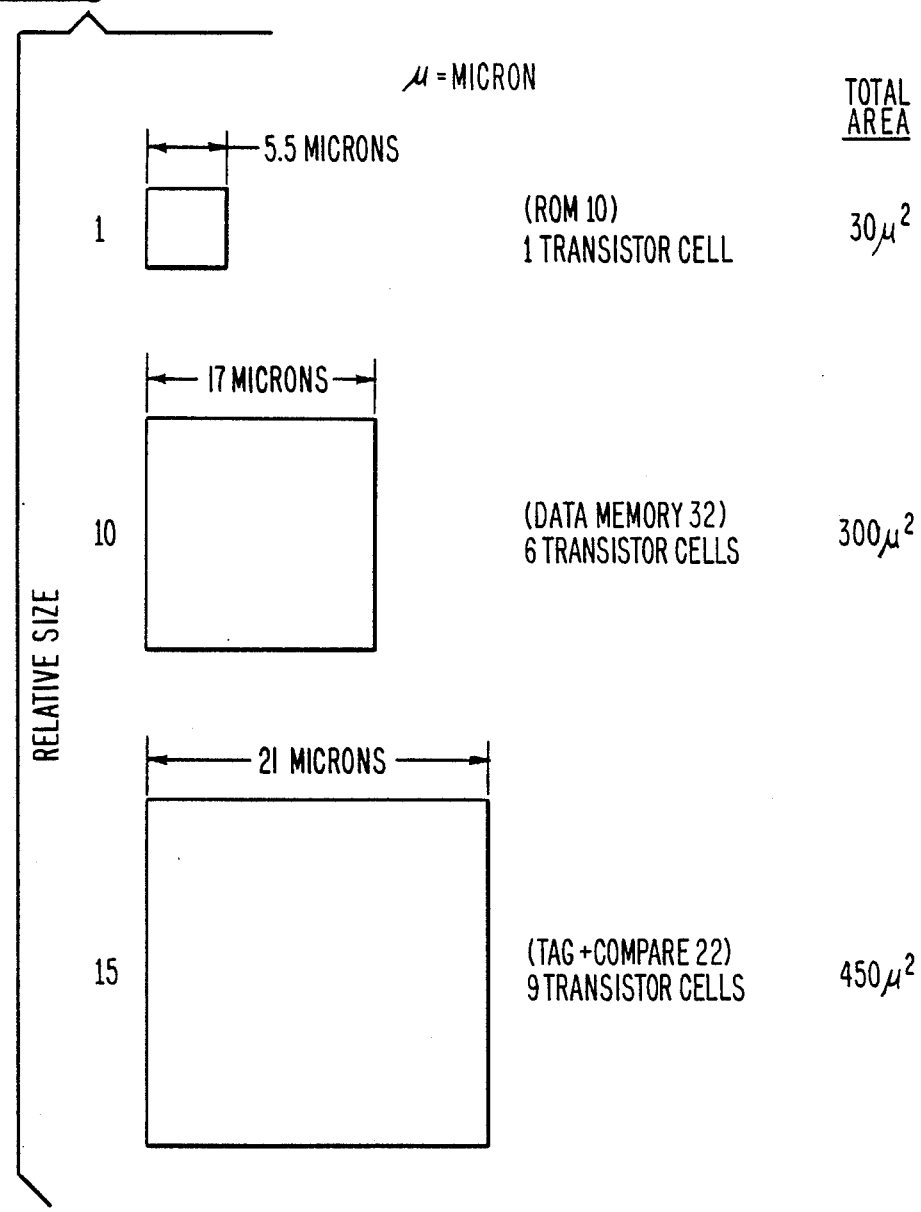
FIG. 4 is a drawing which shows the relative sizes of the ROM memory unit, the Static RAM unit and the CAM unit.

Now referring to FIG. 4, there is seen a square block which represents one cell of the ROM 10. This one cell is a square of which each side has the length of 5.5 microns for a total area of 30 square microns.

Now with respect to the TAG Memory 22, it is possible to calculate the required area of microns which will be necessary to house the TAG Memory for 12½ percent reprogrammability of the ROM 10.

In the TAG Memory 22, the "m" is equal to 256 and the "n" is equal to 11.

Thus, 256×11×(transistor cells)×450 square microns equals the figure of 1,267,200 square microns which is the area required for the TAG Memory of 256 locations each having 11 bits of data. Now taking the square root of this area, it is seen that this represents a square of 4 sides, each of which has a length of 1,125 microns (44.29 mils).

Now in regard to the SRAM Data Memory 32, here m is equal to 256 and n is equal to 45 to which is added the requirement for 300 square microns for each SRAM cell. Thus, 256×45×(300 square microns) equals the figure of 3,456,000 square microns.

Now, taking the square root of this figure, this develops into a square area of four sides, of which each side has the length of 1,859 microns (73.19 mils).

Now to look at the TAG Memory 22 and Data Memory 22 in its totality, it is observed that the TAG Memory required 1,267,200 square microns while the Data Memory required 3,456,000 square microns which leads to a total area of 4,723,000 square microns.

Taking the square root of the total number square microns required, this leads to a square area having four sides, of which each side has the length of 2,173 microns. And looked at in terms of 1/1000 of an inch (mils) this figure is seen to have the length of 85.55 mils for the CAM 50 which holds TAG Memory 22 and Data Memory 32.

Referring to FIG. 4, the SRAM for the TAG Memory shows a typical unit of six transistors which covers a square area of 300 square microns which is a square of 17 microns on each side.

Then again referring to FIG. 4, the TAG Memory can be viewed as a set of 9 transistors which covers a square area of 450 square microns which involves a square having each side equal to 21 microns.

Thus, the figure in the calculation of the TAG Memory 22 involves the use of the 450 square micron figure for each 9 transistor cells while the calculations for the spatial requirements of the Data Memory 32 requires the use of the figure of 300 square microns which represents a set of 6 transistor cells.

It may be noted from FIG. 4, by observing the relative sizes of the 3 square blocks—that if the ROM is given a value of 1 then the SRAM 32 for data will have a relative size factor of 10—and that the TAG Memory 22 will have a relative size of 15 in order to provide a relative 12½ percent capability of reprogrammability.

Now, if it is considered that a typical chip area constitutes a size of a square which is 550 mils in length on each side of the square, then it is seen that a square area will require 107.8 mils (TAG Memory and Data Memory) and will occupy only a very small portion of the chip. Thus, it is quite easily feasible to provide the reprogrammability function by using up only the square area of 107.8 mils on a chip having a large area of 550 mils on each side.

Now, if instead of using a non-programmable ROM such as ROM 10 and it was decided to use a SRAM instead (in order to provide reprogrammability) then it is seen that:

2K×45×300 would be equal to 27,648,000 square microns of spatial area.

This would represent a square on which each side had a length of 5,258 microns which is the equivalent of 207 mils.

Thus by comparing a square of 207 mils against a square of 107 mils, it is possible to see that there is a space saving having a ratio of 4:1 while at the same time providing a reprogramming capability of 12½ percent (or one location in eight) to be reprogrammable and/or extendable.

There has been described herein a system for efficiently providing reprogramming capability for portions of a Read Only Memory (ROM) which has fixed non-alterable data words residing therein which cannot be altered within the ROM. While other circuit variations might be capable of accomplishing these features, using the same basic concepts, it should be understood that the invention is encompassed by the following claims.

What is claimed is:

1. A partially programmable control store memory system comprising:
   (a) a first Read Only Memory (ROM) means for storing data words;
   (b) a Content Addressable Memory (CAM) means including a RAM TAG Memory means and a RAM data memory means wherein said TAG Memory means holds addresses, of any address locations of said ROM Memory means which are to be updated, and said RAM data memory means holds updated data words which are to replace any selected one or more data words in said ROM memory means;
   (c) address bus input means for delivering a data word address simultaneously to said ROM memory means and to said Content Addressable Memory means;
   (d) selection means for
      (i) comparing an input address received by said CAM means with resident addresses in said TAG Memory means; and for
      (ii) generating a hit signal to a multiplexer unit when a match occurs, or a no-hit signal when no match occurs; and for
      (iii) accessing said data memory means to transfer an updated data word from the matching address to said multiplexer,
   said multiplexer unit receiving said hit/no-hit signal to determined whether a data word from said ROM means or from said data memory means will be transmitted to an output register;
   wherein said ROM means includes "m" addressable location where each location holds "n" bits forming a data word; and
   said TAG memory means includes "m/r" addressable locations where each location holds $Log_2$ "m" bits of address data; and "r" represents the percentage proportion of the "m" addressable locations in said ROM means which are desired to be updated; and
   said RAM data memory means includes "m/r" addressable locations where each location holds "n" bits forming an updated data word.

2. An integrated circuit chip using a ROM memory having non-alterable earlier-placed data word information therein, together with a Content Addressable Memory for enabling the reprogrammability of selected locations in the Read Only Memory (ROM) which can enable the output of an updated access data word, the combination comprising:
   (a) ROM means for storing a first group of data words, said ROM means including:
      (a1) "m" locations for storing data words;
      (a2) "n" bits of length for each data word;
   (b) a Content Addressable Memory means including:
      (b1) means for storing updated word information to be used to replace the earlier-placed non-alterable word information residing in selected locations of said ROM means, said means for storing including:
         (b1a) a TAG memory having m/r locations where "r" is equal to the proportion of locations in the said ROM means which can be re-programmed, said TAG memory providing a TAG address output to a data memory, said TAG memory including:
            (i) a plurality of NOR gates allocated to provide one of said NOR gates for each memory location in said TAG memory, and wherein each said memory location of said TAG memory includes:
            (j) a group of "n" core cells wherein each core cell includes:
            (j1) a static RAM cell;
            (j2) a compare circuit unit wherein each compare circuit unit provides an input bit match line to its respective NOR gate, and said input bit match lines form a bit match bus which connects to the input of said respective NOR gate;
            (j3) and wherein each NOR gate includes a word match output line forming a group of word match lines provided to an output OR gate, said group of word match lines forming a word match output bus which also connects to the input of said data memory;
            (j4) a means for selecting an accessed data word output from one of the said ROM means or said Content Addressable Memory means;
            (j5) said output OR gate operating to generate a selection signal to said means for selecting the accessed data word output; and
         (b1b) wherein said TAG memory holds TAG address data words having a width of $log_2$ "m" bits;
         (b1c) said data word memory having m/r locations and receiving said TAG address output.

3. The combination of claim 2 wherein said means for selection includes a multiplexer unit which transmits a data word output selected from said ROM means or from said CAM means.

4. The combination of claim 3 which includes:
   (a) an output register connected to the output of said multiplexer in order to receive the data word output transmitted by said multiplexer;
   (b) said data word output selected by said multiplexer unit having been selected either from said ROM means or from said CAM means according to the selection signal from said output OR gate which senses whether or not the address of an updated data word has been accessed.

5. A single integrated circuit chip using a ROM Memory having earlier-placed non-alterable data word information therein and cooperating together with a Content Addressable Memory for enabling the reprogrammability of selected locations in said Read Only Memory (ROM) which locations can be output as an access data word output, the combination comprising:
   (a) ROM means for storing a first group of non-alterable data words, said ROM means including:
      (a1) "m" locations for storing data words;
      (a2) "n" bits of length for each data word;
   (b) a Content Addressable Memory means including:

(b1) means for storing updated word information and replacing the non-alterable earlier word information residing in selected locations of said ROM means, said means for storing and replacing including:
  (b1a) a TAG memory having m/r memory locations where "r" is equal to the proportion of locations in the ROM which can be reprogrammed, said TAG Memory holding TAG addresses of data words where each address has a width of $\log_2 m$ bits and providing a TAG address output to a data memory;
  (b1b) a plurality of NOR gates allocated to provide one of said NOR gates for each said memory location in said TAG Memory; and
wherein each said memory location of said TAG Memory comprises a group of "n" core cells and each core cell includes:
  (i) a Static RAM Cell;
  (ii) a compare circuit unit wherein each compare circuit unit provides an input bit match line which form a bit match bus which connects to the input of said respective NOR gate;
  (iii) and wherein each NOR gate includes a word match output line to an output OR gate, each word match output line being combined forming a word match output bus which also connects to the input of a data memory;
  (iv) said output OR gate operating to generate a selection signal to said selection means;
  (b1c) said data memory having m/r locations and receiving said TAG address output; said data memory holding updated word data, with each word having a size of "n" bits;
(c) address means connected to provide addresses to said ROM means and to said Content Addressable Memory means (CAM);
(d) means for selecting the accessed data word output from either said ROM or said CAM.

6. The combination of claim 5 wherein said selection means includes a multiplexer unit which receives an output from said ROM means and from said CAM means.

7. The combination of claim 6 which includes:
(a) an output register connected to the output of said multiplexer in order to receive the data word selected by said multiplexer.

8. The combination of claim 5 which includes:
(a) A ROM output register for temporarily holding the output word accessed from said ROM means;
(b) a data output register for temporarily holding the data accessed from said data memory; and
(c) wherein said ROM register and said data register provide output connection means to a multiplexer;
(d) wherein said means for selecting includes a multiplexer unit activated by said OR gate, connected to said TAG Memory, which senses when the address of an updated data word is matched.

* * * * *